United States Patent
Weber et al.

[11] Patent Number: 6,128,893
[45] Date of Patent: Oct. 10, 2000

[54] FASTENING ARRANGEMENT WITH A CHAIN LINK AND A FIXING UNIT FOR LINES

[75] Inventors: Willibald Weber, Netphen; Roland Muller, Siegen, both of Germany

[73] Assignee: Kabelschlepp GmbH, Siegen, Germany

[21] Appl. No.: 09/254,982

[22] PCT Filed: Nov. 4, 1997

[86] PCT No.: PCT/EP97/06078

§ 371 Date: Oct. 4, 1999

§ 102(e) Date: Oct. 4, 1999

[87] PCT Pub. No.: WO98/21503

PCT Pub. Date: May 22, 1998

[30] Foreign Application Priority Data

Nov. 14, 1996 [DE] Germany ............................ 296 19 833

[51] Int. Cl.[7] .................................................. F16G 13/16
[52] U.S. Cl. ........................ 59/78.1; 59/900; 248/49; 248/51
[58] Field of Search ........................ 59/78.1, 900; 248/59, 248/51

[56] References Cited

U.S. PATENT DOCUMENTS

| | | | |
|---|---|---|---|
| 4,833,876 | 5/1989 | Kitao et al. ............................ | 59/78.1 |
| 5,157,913 | 10/1992 | Wehler et al. ............................ | 59/78.1 |
| 5,220,779 | 6/1993 | Tatsuta et al. ............................ | 59/78.1 |
| 5,768,882 | 6/1998 | Weber et al. ............................ | 59/78.1 |

FOREIGN PATENT DOCUMENTS

| | | |
|---|---|---|
| 800468 | 12/1968 | Canada .................................... 59/78.1 |
| 217086 | 8/1986 | European Pat. Off. ................ 59/78.1 |
| 94 17 379 | 12/1994 | Germany . |
| 44 09 517 | 9/1995 | Germany . |

*Primary Examiner*—David Jones
*Attorney, Agent, or Firm*—Alston & Bird LLP

[57] ABSTRACT

A fastening arrangement having a chain link (1). The chain link (1) has two link plates (2, 3), located spaced apart opposite one another, with edge and side faces (4, 5, 6) and at least one crossmember (7) which connects the link plates (2, 3). A fastening unit (8) is provided which has webs or tines (9, 10) which are spaced apart and extend in the longitudinal direction of the link plates (2, 3). The fastening unit (8), the crossmember (7) and/or at least one link plate (2, 3) have interacting connecting means (13, 20), by means of which the fastening unit (8) can be connected to the crossmember (7) and/or at least one link plate (2, 3) with the webs (9, 10) directed inwards into or inwards into and outwards out of the chain link (1).

19 Claims, 5 Drawing Sheets

FASTENING ARRANGEMENT WITH A CHAIN LINK AND A FIXING UNIT FOR LINES

BACKGROUND OF THE INVENTION

The invention relates to a fastening arrangement having a chain link and having a fastening unit for lines.

To provide movable apparatuses and machines with all types of consumables, supply lines are used, which are conducted in an energy conducting chain. One end of the energy conducting chain is arranged in a stationary manner. The other end of the energy conducting chain is connected to the apparatus or a machine. The energy conducting chain comprises a large number of chain links connected to one another in an articulated manner.

During the operation, the energy conducting chain is subjected to alternating bending stress. The supply lines held and conducted in the energy conducting chain are also stressed by alternating bending. It is therefore necessary for the supply lines to be fastened in a stress-relieved manner at least at the movable end of the energy conducting chain. An example of stress-relieved fastening of the lines is known from the utility model G 94 17 379.6. For the stress-relieved fastening of the lines, it is proposed that the end fastening part for energy conducting chains has a comb-like or rake-like connection profile whose tines, arranged on a supporting profile, extend in the longitudinal direction of the energy conducting chain or the supply lines with spacing from one another. The supporting profile is arranged or can be fastened between the link plates of the end fastening chain link. The connection part may be configured to be integral with the end fastening link of the chain. Furthermore, it is known that the comb-like or rake-like connection part can be introduced with its supporting profile into a holding groove of a bottom fastening strip of the end fastening chain link.

A device for the stress relief of lines is known from DE 44 09 517 A1. The device comprises a comb-like body and connecting elements, by means s of which the supply lines can be connected to the tines extending in the direction of the lines. The connecting elements involved are cable holders which are known per se. The body has tines which are formed on both its sides and in opposite directions, the tines on the one side being wider than the tines on the other side.

The present invention is based on the object of specifying a fastening arrangement having a chain link and a fastening unit for supply lines, which fastening arrangement is configured in a space-saving manner. A further aim of the present invention is to specify a fastening arrangement, by means of which the mechanical loading of the fastening unit is reduced.

SUMMARY OF THE INVENTION

The fastening arrangement according to the invention comprises a chain link and a fastening unit. The chain link has two link plates (also referred to herein as side plates) which are located spaced apart opposite one another. Each link plate has a bottom edge and side faces.

The link plates are connected to one another by a crossmember. The fastening unit has webs (also referred to herein as tines) which are spaced apart and extend in the longitudinal direction of the link plates. The fastening unit, the crossmember and/or at least one link plate have interacting connecting means, by means of which the fastening unit can be connected to the crossmember and/or at least one link plate with the webs or tines directed longitudinally inwards into or inwards into and outwards out of the chain link. In the fastening arrangement according to the invention, the fastening unit can be connected to the crossmember and/or at least one link plate in such a way that the webs of the fastening unit are directed inwards into the chain link. By means of this refinement of the fastening arrangement, no additional installation space is required, since the fastening unit does not extend beyond the chain link. By this measure, a fastening arrangement having a chain link and a fastening unit is provided, which can also be used in energy conducting chains which are already in operation. The possibility is thus provided of retrofitting the energy conducting chains with the fastening arrangement according to the invention. The outlay for retrofitting is relatively low, as is explained in greater detail below. Only the fastening chain link needs to be exchanged.

By means of the fastening arrangement according to the invention, the possibility is also provided of fastening any supply line at two regions which are spaced apart in the longitudinal direction of the supply line. The fastening of the supply line can be connected to the webs directed inwards into the chain link and to the webs directed outwards out of the chain link.

The connection of a supply line to the webs directed inwards and the webs directed outwards can take place by means of the flexible line holders which are known per se. This refinement of the fastening arrangement ensures that the supply line is always reliably connected to the fastening unit. In the event of failure or incorrect attachment of a line holder, the farther line holder takes on the fastening task. Furthermore, by this arrangement, a more favorable introduction of force originating from a supply line into the fastening unit and thus into the chain link is achieved, as a result of which the latter is stressed mechanically to a lesser extent.

Preference is given to a fastening arrangement in which the fastening unit has connecting means which engage at least partially around the crossmember. This refinement has the advantage that the fastening unit can be positioned more easily on the crossmember and, on the other hand, that it permits the introduction of force into the crossmember over a large area.

According to a further advantageous refinement, it is proposed that the connecting means has at least one stop which can be brought at least to rest against an edge region of the crossmember running essentially transversely to the longitudinal direction of the chain link. In this case, preference is given to a refinement in which the crossmember is arranged between two stops configured as connecting means. In this case, the distance between the stops can be dimensioned such that the connecting means is pressed onto the crossmember. As a result, a fastening arrangement can be provided, which is already partially preassembled.

The stops of the connecting means are preferably configured in the form of a rib. The fastening unit is preferably of integral design. The material used to produce a fastening unit depends on the area of application. In this case, preference is given to a design of the fastening unit made of a plastic material. In an integral design of the fastening unit, the webs are at least partially formed onto the stops.

According to a further particularly advantageous refinement of the fastening arrangement, it is proposed that the crossmember is arranged between the link plates at a distance from the edge faces running in the longitudinal direction, the fastening unit, preferably bearing against the crossmember, being at least partially flush with the edge faces running in the longitudinal direction. By means of this refinement of the fastening arrangement, the fastening unit is pressed by the crossmember against a flat resting or contact face, against which the edge faces of the link plates running in the longitudinal direction are also pressed.

The crossmember preferably has connecting means in the form of at least one engagement cam or boss which engages in a corresponding receiver of the fastening unit. Preference is given to at least two engagement cams which are spaced apart and are arranged on a line running essentially transversely to the longitudinal direction. The fastening unit may have a separate receiver for each engagement cam. A refinement of the fastening unit is also possible, in which, for example, two engagement cams protrude into a common receiver. This refinement of the fastening unit is particularly expedient whenever the distance between two link plates is relatively short.

For the simple and expedient assembly of the fastening arrangement according to the invention, it is proposed that at least two of the engagement cams each have a through-bore, and the engagement cams are at least partially flush with the edge faces running in the longitudinal direction. By means of this refinement, an exchange of the fastening chain links which are already known can take place without this increasing the outlay for assembly. The chain link can also be used individually, i.e. without a fastening unit as end fastening chain link, since the pressing-on force against a contact or resting face is introduced by the engagement cams which are at least partially flush with the edge faces running in the longitudinal direction.

A further advantageous refinement of the fastening arrangement consists in that each link plate has, in an edge face running in the longitudinal direction, a recess for the positive-locking and/or non-positive holding of the fastening unit. In such a refinement of the link plates, the formation of engagement cams can be dispensed with, since their functional task is taken over by the recesses in the edge face of the link plate running in the longitudinal direction.

Furthermore, a fastening chain link according to the invention, in particular an end fastening link, of an energy conducting chain, is proposed, which link has two link plates, located spaced apart opposite one another, with edge and side faces and at least one crossmember which connects the link plates. The fastening chain link has a fastening unit which has webs which are spaced apart and extend in the longitudinal direction of the link plates. The fastening unit, the crossmember and/or at least one link plate of the fastening chain link have interacting connecting means, by means of which the fastening unit can be connected, preferably in a releasable manner, to the crossmember and/or at least one link plate with webs directed inwards into or inwards into and outwards out of the chain link. The further developments of the fastening chain link preferably correspond to the further developments of the fastening arrangement as described below.

BRIEF DESCRIPTION OF THE DRAWINGS

Further advantages and details of the fastening arrangement according to the invention are explained with reference to three exemplary embodiments illustrated in the drawing, in which.

DETAILED DESCRIPTION OF THE PREFERRED EMBODIMENTS

Figure 1:
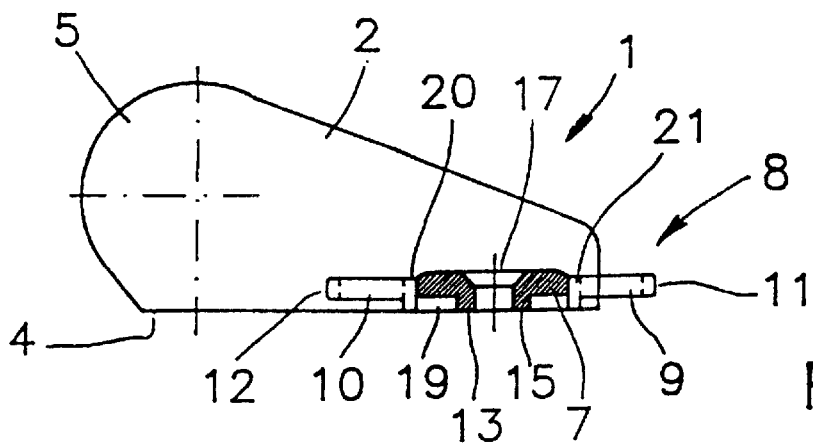
FIG. 1 shows a first exemplary embodiment of a fastening arrangement in section.
Figure 2:
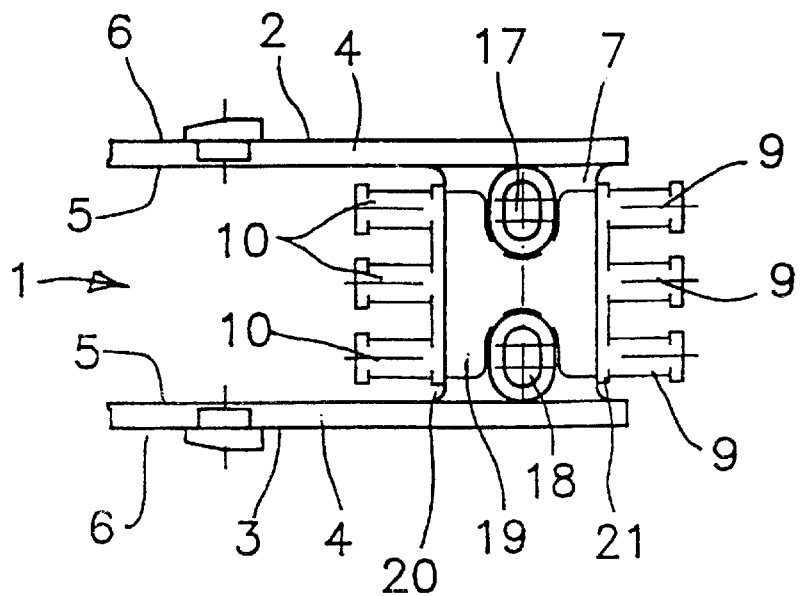
FIG. 2 shows a plan view of the fastening arrangement according to FIG. 1.
Figure 3:
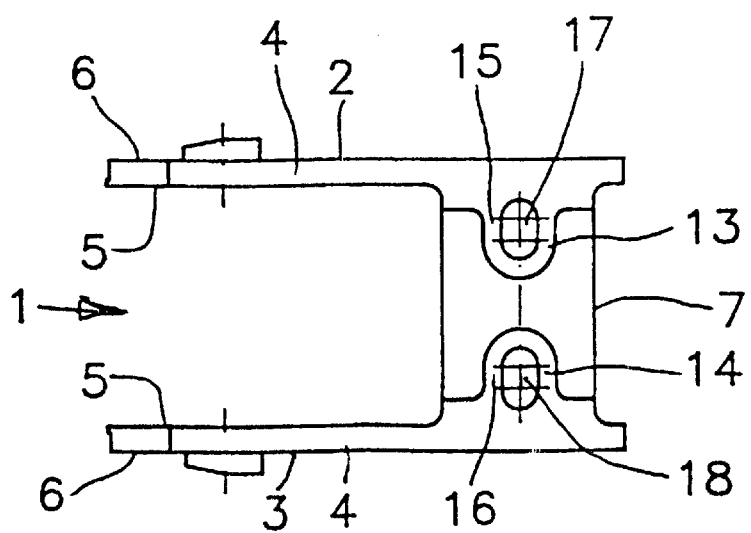
FIG. 3 shows a bottom view of the chain link of the fastening arrangement according to FIG. 1.

FIGS. 1 and 2 show a first embodiment of a fastening arrangement. The fastening arrangement has a chain link 1. The chain link 1 has two link plates 2, 3 located spaced apart opposite one another. Each link plate 2, 3 has an edge face 4 which, in the assembled state of the fastening arrangement bears against a rest which is not illustrated. Each link plate 2, 3 has side faces 5, 6. The link plates 2, 3 are connected to one another via a crossmember 7. The fastening arrangement has a fastening unit 8. The fastening unit 8 has webs 9, 10 which are spaced apart, extend in the longitudinal direction of the link plates 2, 3 and are configured disposed in opposite directions. At its free end, each web 9, 10 has a top 11 and 12 respectively, which is greater in cross-section than the cross-section of the web 9 or 10.

The fastening arrangement furthermore has connecting means, by means of which the fastening unit 8 interacts with the crossmember 7, and by means of which the fastening unit 8 can be connected with the webs 10 directed inwards into the chain link 1 and the webs 9 directed outwards out of the chain link 1.

As can be seen in FIG. 1, the crossmember 7 is configured at a distance from the edge face 4 running in the longitudinal direction. The crossmember 7 has connecting means in the form of engagement cams 13, 14. The engagement cams 13, 14 are spaced apart and lie on a line running essentially transversely to the longitudinal direction of the chain link. The end faces 15, 16 of the engagement cams 13, 14 are of flat configuration and are flush with the edge face 4 of the link plate 2 or 3. Each engagement cam 13, 14 has a through-bore 17 and 18 respectively. The through-bores 17, 18 run essentially perpendicular to the edge face 4. Connecting means, for example in the form of screws, can be passed through the through-bores 17, 18 and screwed to a rest which is not illustrated.

Figure 4:
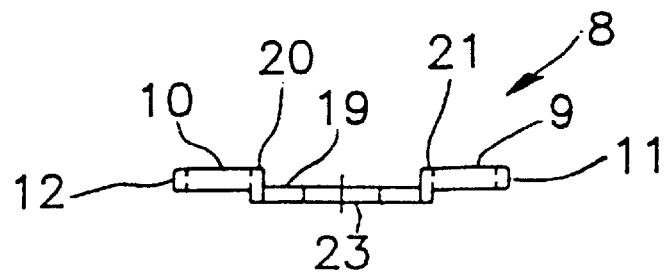
FIG. 4 shows a front view of a fastening unit of the fastening arrangement according to FIG. 1.
Figure 5:
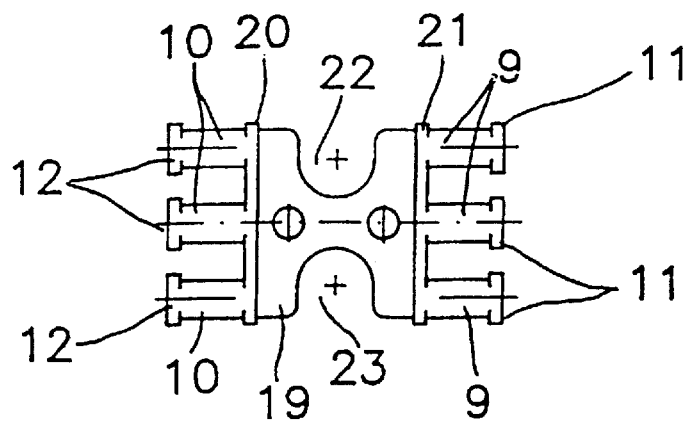
FIG. 5 shows a plan view of the fastening unit according to FIG. 4.

FIGS. 4 and 5 show a fastening unit 8 of the fastening arrangement according to FIG. 1. The fastening unit 8 has a holding section 19. The webs 9, 10 are configured on both sides of the holding section 19 and in opposite directions. The holding section 19 is of essentially plate-like configuration. It has two stops 20, 21 which extend essentially transversely to the longitudinal direction of the chain link 1. The holding section 19 and the stops 20, 21 are configured in such a way that the crossmember 7 is arranged between the stops 20, 21, as can be seen in FIGS. 1 and 2. The stops 20, 21 are formed by ribs. The holding section 19 of the fastening unit 8 has two receivers 22, 23 in which the engagement cams 13, 14 of the crossmember 7 engage. The receivers 22, 23 are formed by lateral cutouts, as can be seen in FIG. 5.

The thickness of the holding section 19 is preferably selected such that the holding section 19 can be arranged between the underside of the crossmember 7 and the edge face 4.

Figure 6:
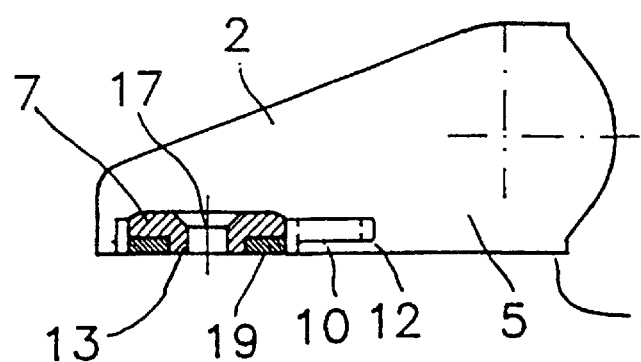
FIG. 6 shows a second exemplary embodiment of a fastening arrangement in section.
Figure 7:
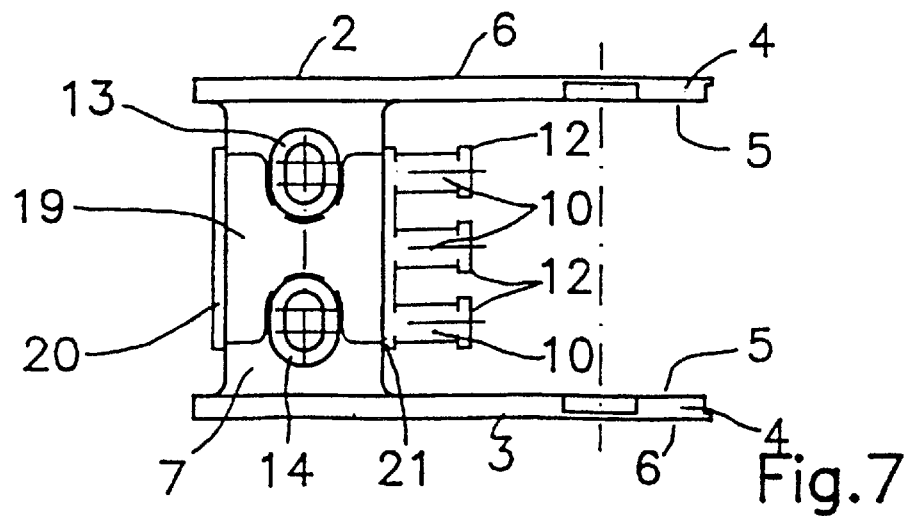
FIG. 7 shows a plan view of the fastening arrangement according to FIG. 6.
Figure 8:
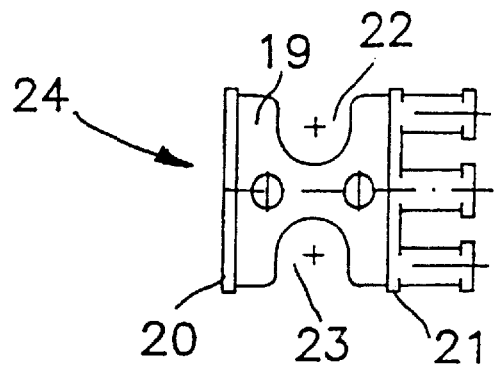
FIG. 8 shows a plan view of the fastening unit of the fastening arrangement according to FIG. 6.

We will now refer to the second embodiment of a fastening arrangement illustrated in FIGS. 6, 7 and 8. The fastening arrangement has a chain link 1 and a fastening unit 8. The chain link comprises two link plates 2, 3 which are located spaced apart opposite one another and a crossmember 7 which connects the link plates. The fastening unit 8 has webs 10 which are spaced apart and extend in the longitudinal direction of the link plates 2, 3. The fastening unit 8 and the crossmember 7 have interacting connecting means, by means of which the fastening unit 8 can be connected to the crossmember 7 by webs 10 directed inwards into the chain link 1. The refinement of the fastening arrangement illustrated in FIGS. 6 to 8 corresponds essentially to the fastening arrangement illustrated in FIGS. 1 to 5 with regard to the connection of the fastening unit 8 to the crossmember 7. In contrast to the fastening arrangement illustrated in FIGS. 1 to 5, the fastening unit 24 has webs 10 which only extend inwards into the chain link 1. The fastening unit 24 has a holding section 19 with two stops 20, 21 configured with spacing from one another. The stops 20, 21 bear against the longitudinal edges of the crossmember 7. The crossmember 7 has engagement cams 13, 14 which engage in the receivers 22, 23 configured in the holding section 19 of the connecting unit 24.

Figure 9:
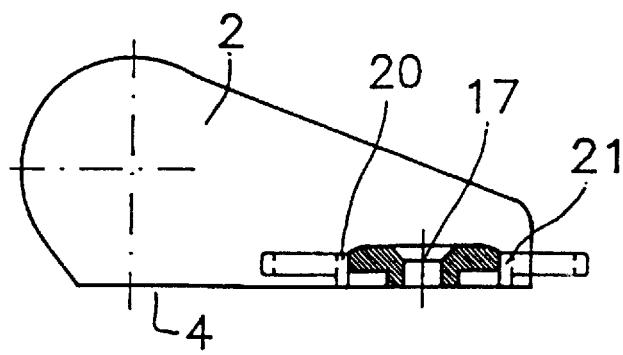
FIG. 9 shows a third exemplary embodiment of a fastening arrangement in section.
Figure 10:
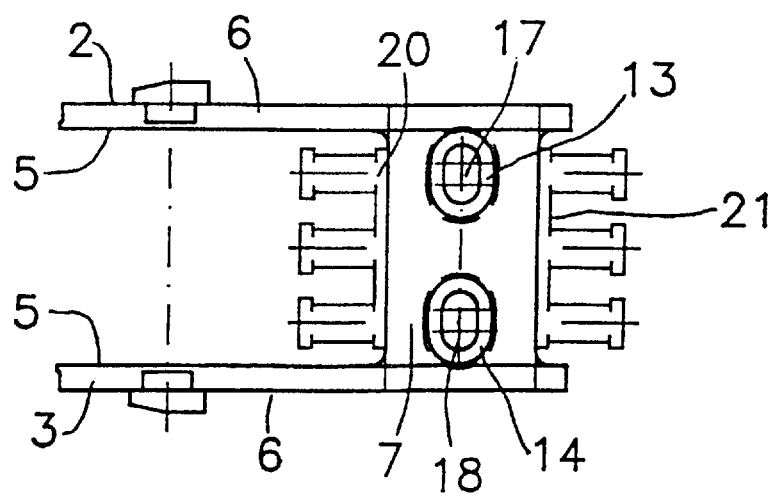
FIG. 10 shows a plan view of the fastening arrangement according to FIG. 3.
Figure 11:
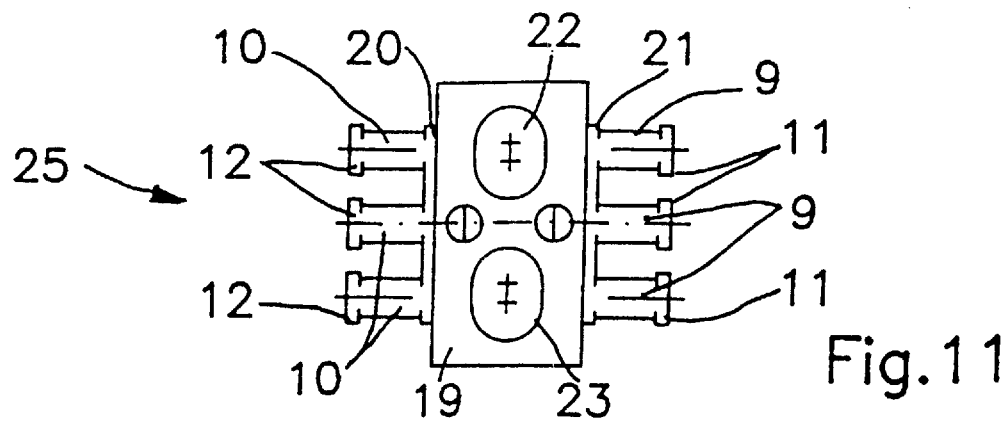
FIG. 11 shows a plan view of a fastening unit of the fastening arrangement according to FIG. 9.

In a fastening arrangement, such as is illustrated in FIGS. 9 and 10, the fastening unit 25 is illustrated in accordance with FIG. 11. The fastening unit 25 has a holding section 19 which extends over the entire distance between the link plates 2, 3. Configured in the holding section 19 are hole-like receivers 22, 23 into which the engagement cams 13, 14 protrude. The inner contour of the receivers 22, 23 corresponds to the outer contour of the engagement cams 13, 14. The engagement cams 13, 14 may have differing geometry, as a result of which the fastening unit 25 can only be connected to the chain link 1 in a predetermined position.

Figure 12:
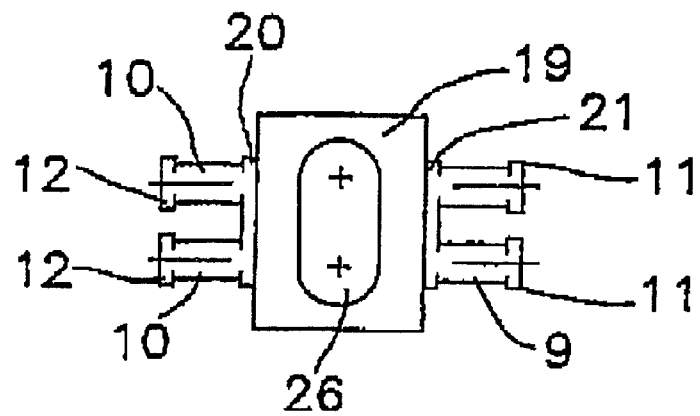
FIG. 12 shows a further refinement of a fastening unit.
Figure 13:
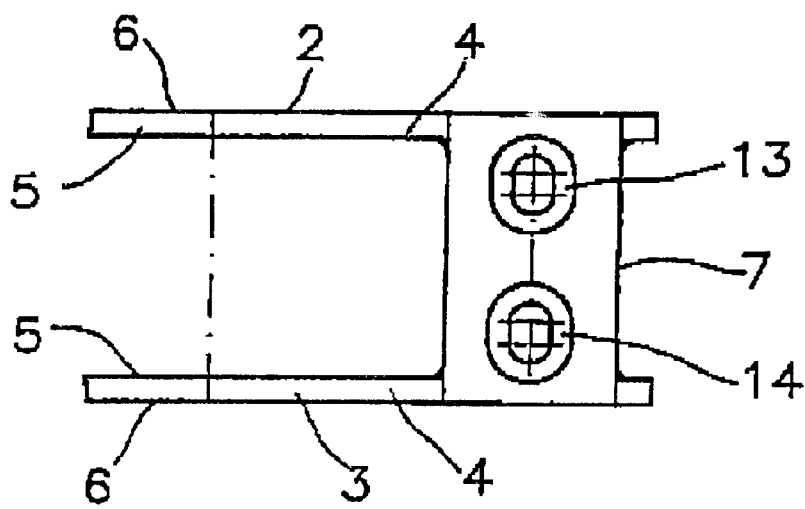
FIG. 13 shows a plan view of a chain link of a fastening arrangement according to FIG. 9.
Figure 14:
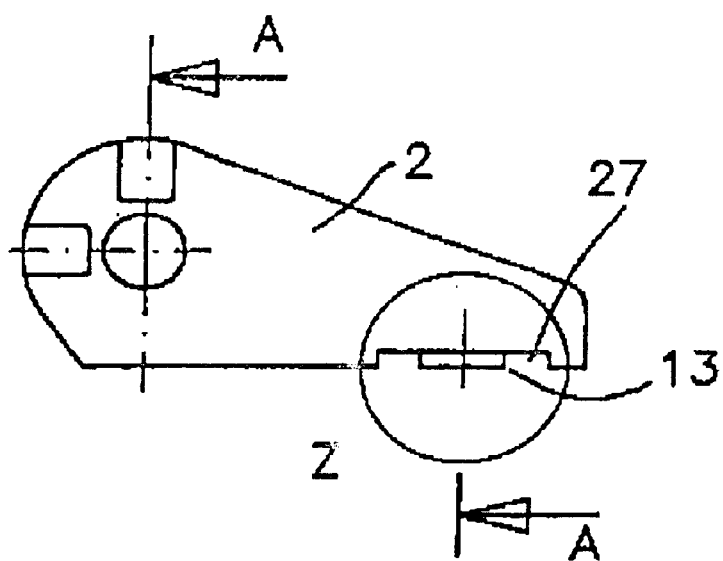
FIG. 14 shows a front view of an embodiment of a chain link for a fastening arrangement.
Figure 15:
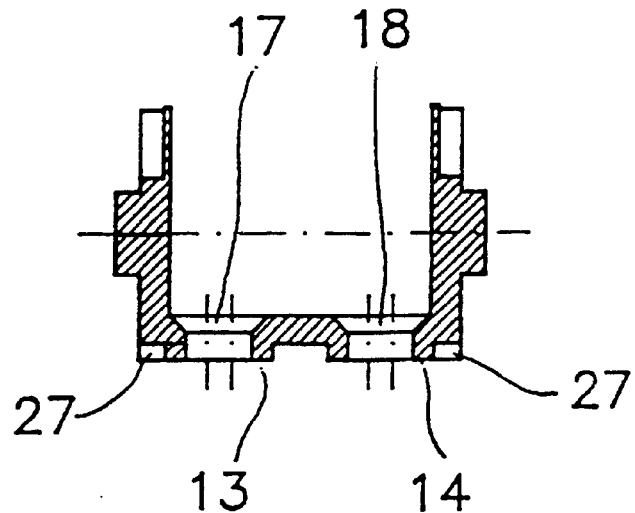
FIG. 15 shows a sectional view of the chain link according to Figure 14 along the section line A—A.
Figure 16:
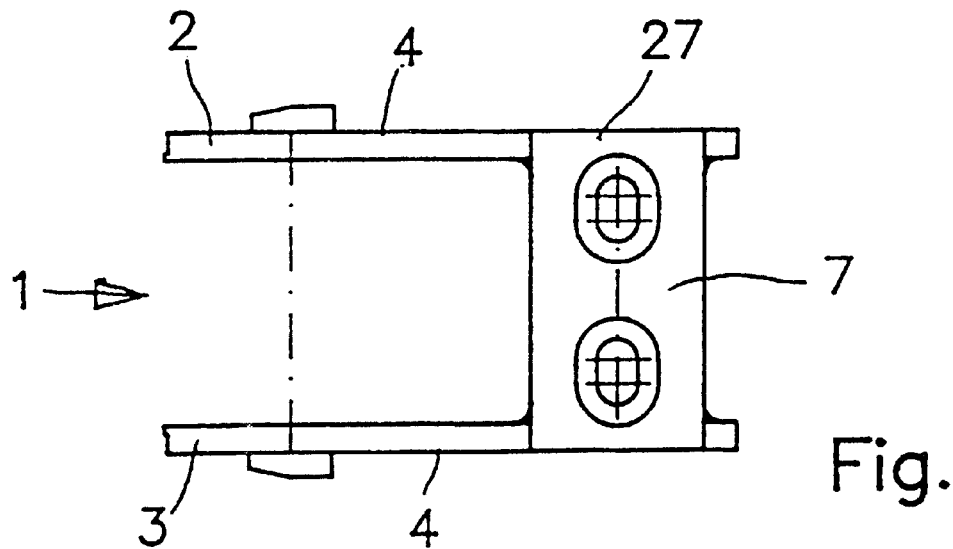
FIG. 16 shows a bottom view of the chain link according to FIG. 14.

With a relatively short distance between the link plates 2, 3, it is expedient for the engagement cams 13, 14 to be formed by a single receiver 26, such as is illustrated in FIG. 12. A chain link with a crossmember 7 which can be connected to the fastening unit 8 according to FIGS. 11 and 12 is illustrated in FIG. 13.

Figure 17:
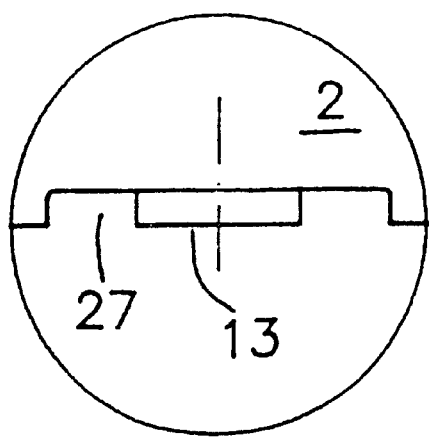
FIG. 17 shows an enlarged view of a detail Z of the chain link according to FIG. 14.

A refinement of the chain link 1 which is suitable by preference for a fastening arrangement is illustrated in FIGS. 14 to 17. The chain link I has two link plates 2, 3 located spaced apart opposite one another. The link plates 2, 3 are connected to one another by a crossmember 7. The crossmember 7 has engagement cams 13, 14. The engagement cams are configured on a common straight line running essentially transversely to the longitudinal direction of the chain link 1. Each engagement cam 13, 14 has a through-bore 17, 18. The end faces of the engagement cams 13, 14 are flush with the edge faces 4 of the chain link 1. Each link plate 2, 3 has a recess 27 in the region of the crossmember 7. The recess 27 serves as a positive-locking and/or non-positive holder of a fastening unit 8. The recess 27 is preferably of dovetail configuration in cross-section, as can be seen in FIG. 17. A section of the fastening unit 8 which engages in the recess 27 preferably has a corresponding outer contour.

What is claimed is:

1. A chain link for an energy conducting guide chain comprising two spaced apart and parallel side plates which define a longitudinal direction along the length thereof, at least one cross member extending transversely between and interconnecting the two side plates, said one cross member including opposite side edges running essentially transverse to the longitudinal direction, a fastening unit having a plurality of tines which are spaced apart from each other and extend in parallel directions, and interacting connecting means connecting the fastening unit to the cross member with the tines extending in the longitudinal direction, with said connecting means including opposing stops on the fastening unit which are positioned to rest against respective ones of the opposite side edges of said one cross member.

2. The chain link as defined in claim 1 wherein the tines lie in a plane which is parallel to the one cross member.

3. The chain link as defined in claim 1 wherein each of said stops is in the form of a rib.

4. The chain link as defined in claim 1 wherein the side plates include bottom edge faces which are co-planar, and wherein the one cross member has a surface which is flush with said bottom edge faces.

5. The chain link as defined in claim 1 wherein the connecting means further includes at least one receptacle on one of the fastening unit and the one cross member, and an engagement boss on the other of the fastening unit and the one cross member for engaging the receptacle.

6. The chain link as defined in claim 1 wherein the connecting means further includes at least two engagement bosses on said one cross member which are spaced apart in a direction essentially transverse to the longitudinal direction, and at least one receptacle on said fastening unit for engaging said bosses.

7. The chain link as defined in claim 6 wherein the side plates include bottom edge faces which are co-planar, and wherein the two bosses have outer faces which are flush with the bottom edge faces of the side plates.

8. The chain link as defined in claim 7 wherein the two bosses each have a through bore.

9. The chain link as defined in claim 7 wherein the connecting means further includes a recess in each of the bottom edge faces of the side plates, and a pair of sections on the fastening unit closely received in respective ones of the recesses of the side plates.

10. The chain link as defined in claim 1 wherein the tines extend outwardly from the one cross member in the longitudinal direction.

11. The chain link as defined in claim 1 wherein the connecting means is releasably secured to the cross member.

12. A chain link for an energy conducting guide chain comprising two spaced apart and parallel side plates which define a longitudinal direction along the length thereof, at least one cross member extending transversely between and interconnecting the two side plates, a fastening unit having a plurality of tines which are spaced apart from each other and extend in parallel directions, and interacting connecting means connecting the fastening unit to the cross member with the tines extending in the longitudinal direction, said connecting means including at least one substantially annular engagement boss on said one cross member, and at least one receptacle on said fastening unit for at least substantially encircling and engaging said one boss.

13. The chain link as defined in claim 12 wherein said connecting means includes at least two engagement bosses on said one cross member which are spaced apart in a direction essentially transverse to the longitudinal direction, and with said at least one receptacle at least substantially encircling and engaging said bosses.

14. The chain link as defined in claim 13 wherein the side plates include bottom edge faces which are co-planar, and wherein the two bosses have outer faces which are flush with the bottom edge faces of the side plates.

15. The chain link as defined in claim 14 wherein the two bosses each have a through bore.

16. The chain link as defined in claim 15 wherein the connecting means further includes a recess in each of the bottom edge faces of the side plates, and a pair of sections on the fastening unit closely received in respective ones of the recesses of the side plates.

17. A chain link for an energy conducting guide chain comprising two spaced apart and parallel side plates which define a longitudinal direction along the length thereof, at least one cross member extending transversely between and interconnecting the two side plates, a fastening unit having a plurality of tines which are spaced apart from each other and extend in parallel directions, and interacting connecting means connecting the fastening unit to the side plates with the tines positioned between the side plates and extending in the longitudinal direction, said connecting means including a recess in each of the bottom edge faces of the side plates, and a pair of sections on the fastening unit closely received in respective ones of the recesses of the side plates.

18. The chain link as defined in claim 17 wherein each of the recesses is of dovetail configuration in cross section, and each section of the fastening unit has a corresponding cross sectional outline.

19. The chain link as defined in claim 17 wherein the connecting means further includes at least one engagement boss on the one cross member, and at least one receptacle on the fastening unit for engaging the one boss.

\* \* \* \* \*